Oct. 15, 1968   T. TROGDON ET AL   3,406,235

METHOD AND APPARATUS FOR MANUFACTURING FOAM RUBBER CUSHIONING

Filed March 19, 1965   2 Sheets-Sheet 1

INVENTORS
THOMAS TROGDON
JAMES R. FORE
JOHN O. PETTIGREW

Reuben Wolk
ATTORNEY

Oct. 15, 1968    T. TROGDON ET AL    3,406,235
METHOD AND APPARATUS FOR MANUFACTURING FOAM RUBBER CUSHIONING
Filed March 19, 1965    2 Sheets-Sheet 2
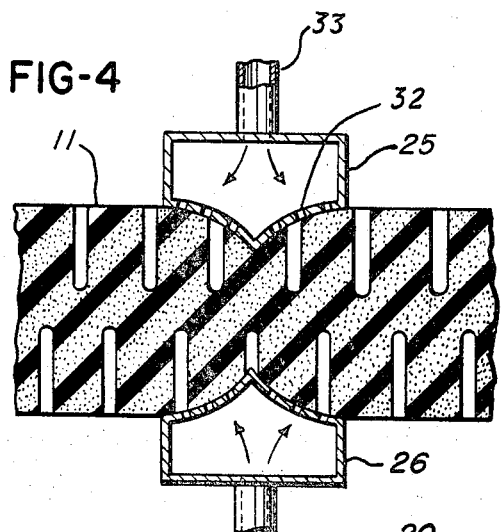
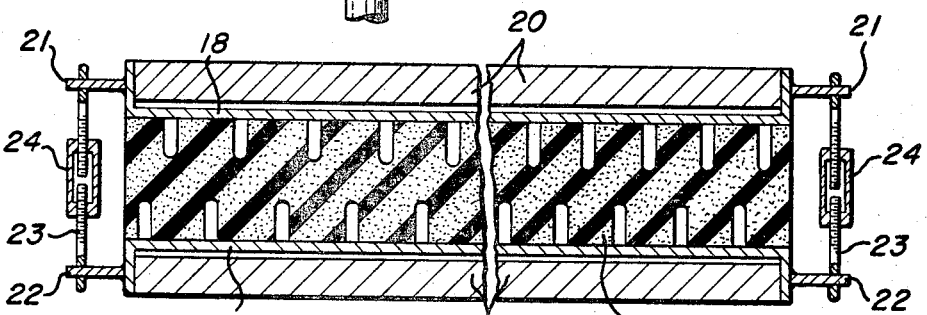
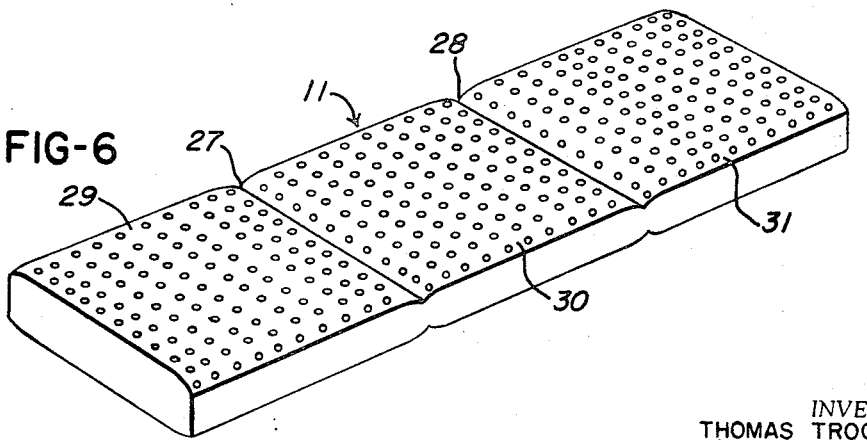
INVENTORS
THOMAS TROGDON
JAMES R. FORE
JOHN O. PETTIGREW
Reuben Wolk
ATTORNEY United States Patent Office 3,406,235
Patented Oct. 15, 1968

3,406,235
METHOD AND APPARATUS FOR MANUFACTURING FOAM RUBBER CUSHIONING
Thomas Trogdon, James R. Fore, and John O. Pettigrew, Waynesville, N.C., assignors to Dayco Corporation, Dayton, Ohio, a corporation of Delaware
Filed Mar. 19, 1965, Ser. No. 441,100
10 Claims. (Cl. 264—321)

ABSTRACT OF THE DISCLOSURE

Apparatus and method of forming additional crowned areas in foam rubber cushioning. This is accomplished by applying heated V-shaped clamping members to the upper and lower surfaces. By applying pressure to these members and forcing them toward each other and into the surfaces of the cushioning while simultaneously applying moisture and heat, a permanent deformation occurs.

---

This invention relates to foam rubber cushioning members and to the method of manufacturing same. More particularly, it relates to cushioning used in the manufacture of furniture, such as sofas, chairs, and the like.

Foam rubber products are normally manufactured in metal molds having upper and lower mold members, the cavity of the lower member partially filled with a foamable liquid rubber latex composition; that is, a composition which has been compounded to permit foaming when the mold is closed. The material which has been foamed is subsequently coagulated and vulcanized as more fully described in United States Patent No. 2,432,353, issued on Dec. 9, 1947 to Talalay; one of the series of patents which describes the process known as the Talalay process. The cavity of the upper and lower members contain a number of pins which project into the resultant product, so that this product has a number of corings extending inwardly from both surfaces.

The fabrication of foam rubber cushioning has been described in the prior art as, for example, in United States Patent No. 3,028,610, issued on Apr. 10, 1962, to Talalay. In accordance with this patent cushioning may be fabricated in a single slab of a desired size, with the top and bottom surfaces flat and parallel to each other. While cushioning manufactured according to this design has many uses, there are also instances in which the furniture industry desires a slab having a crown or contour in either or both of the transverse and longitudinal directions of the product. A recent trend toward early American furniture has created a demand among furniture manufacturers for cushions with a puffed look, which requires a crown in both directions on either or both of the top and bottom surfaces. The finished product, therefore, should be one in which the edge or box is consistent in thickness on all four of the sides but which is thicker at the crown. As an example, furniture manufacturers prefer to utilize a 4 inch box but may desire a maximum depth of cushion which ranges from 4⅞ inches up to 6½ inches. A typical cushion may be approximately 19 inches wide by 22 inches long. While it is possible to create somewhat of a puffed effect by forcing down the edges of a cushion having a rectangular cross section, such as illustrated in the aforesaid Patent No. 3,028,610, this is an impractical approach for the furniture manufacturer because the foam rubber material is difficult to hold in place while it is being compressed for insertion into a cover. For example, it might be possible to make a 6 inch thick cushion with a rectangular cross section and attempt to force the edges down to a 4 inch dimension by compressing into the fabric cover. This has been found to be very difficult; it is more practical to utilize material with crowned upper and lower surfaces in approximately the dimensions described above. The edges of the crowned surface are formed with a radius to create the beginning of a break from the greater thickness to the box, which is much easier to insert within the fabric cover.

In accordance with the present invention, therefore, it is desired to provide a cushion which is crowned in both transverse and longitudinal directions. These shapes could be created by molding individual cushions, but this is not economically feasible in modern foam rubber processing, nor does this provide sufficient versatility for the average furniture manufacturer. It is much more desirable therefore to mold the cushioning member in its normal length of 75 inches to 109 inches and in a normal width of 21 inches to 30 inches; the cushioning member will be formed with a transverse crown and a series of crowns in the longitudinal direction. Although the cushioning member is originally molded with only the transverse crown or no crown at all, the present invention contemplates a method and apparatus whereby an additional series of crowns in the longitudinal direction are created. The finished surface, therefore, will have a crowned shape which is preferably formed of a flat surface in the center curving into transversely extending, approximately V-shaped grooves at any desired point on the cushioning member, by an expedient of placing the apparatus at these desired points. For added versatility the apparatus may be used either in the manufacturer's plant in connection with the regular manufacturing procedure, or may be used by a furniture manufacturer in his own plant to convert the molded slab, which has breen sent to him, into one having selectively placed V-shaped grooves. Whichever way these grooves are formed, the furniture manufacturer may cut along these transversely extending grooves to form individual cushions.

It is therefore a principal object of this invention to provide a method whereby a foam rubber cushioning member may be separated into a plurality of crowned cushions.

It is a further object of the invention to provide an apparatus for simplifying this separation.

It is a further object of the invention to provide an apparatus which is flexible and easily located at selective points along the cushioning member.

These and other objects of the invention will be more readily apparent in the following specifications, claims, and drawings, in which:

FIGURE 4 is a section similar to FIGURE 3 employing a variation of the novel apparatus.

FIGURE 5 is a section taken along lines 5—5 of FIGURE 2.

FIGURE 6 is a perspective view illustrating the final cushioning member after processing.

Figure 1:
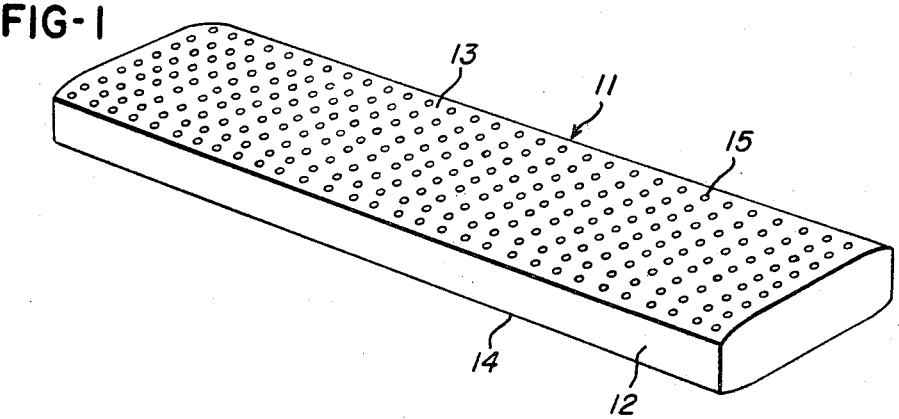
FIGURE 1 is a perspective view of a typical foam rubber cushioning member prior to processing.
Figure 2:
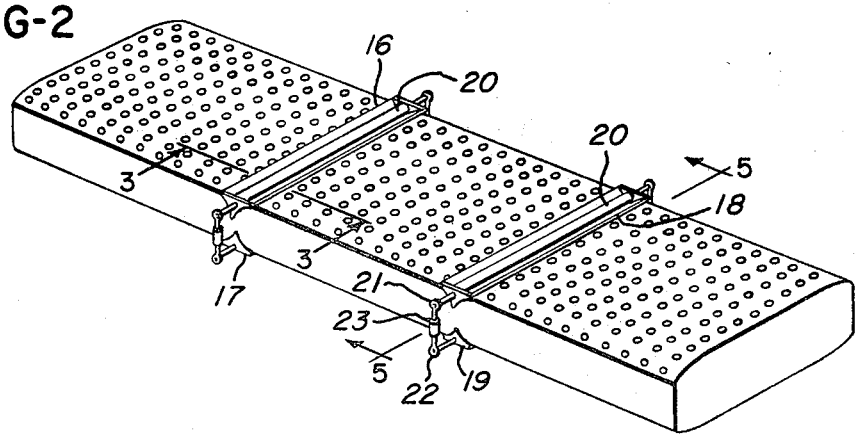
FIGURE 2 is a perspective view of the same cushioning member with the novel apparatus in place.
Figure 3:
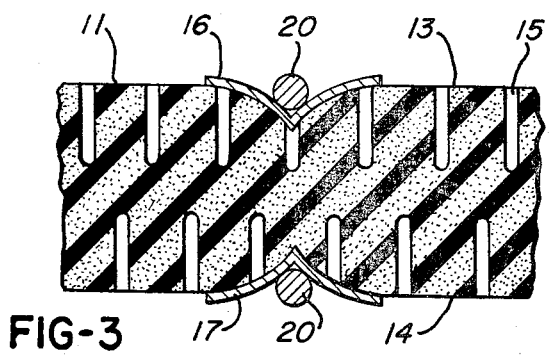
FIGURE 3 is a section taken along lines 3—3 of FIGURE 2.

Referring now to the drawings, FIGURE 1 illustrates a typical foam rubber cushioning member 11 which has been produced in a mold in accordance with standard practice such as described in the above-mentioned Patent No. 2,432,353. This process includes pouring rubber latex into a mold, causing it to foam, coagulating the foam, then vulcanizing the final product to form the molded cushioning member. Member 11 is provided with a box edge 25 extending completely around the member and upper and lower surfaces 13 and 14. The upper and lower surfaces have a series of corings 15 which extend partly inward from both surfaces. The cushioning member may be fabricated as shown with a transversely extending crown, or it may be formed without a crown. In either case, it is desired to create a series of transversely extending crowns for the reasons discussed above. This may be done just after the cushioning member has been stripped from the mold and before it is subjected to the finishing process, such as washing and drying; or it is possible to finish the member and ship it to a furniture manufacturer or other processor, at which point he may form the transverse crowns by the use of an apparatus such as shown in FIGURE 2. This apparatus consists of a plurality of clamp assemblies having a generally V-shaped configuration in order to form curved, generally V-shaped grooves transversely of the member at any selected transverse point thereon, in order to form the cushions in any desired dimension. The clamp assemblies shown in FIGURE 2 consist of an upper clamp 16 and a lower clamp 17 which are located in alignment with each other on the upper and lower surfaces of the cushioning member, and another assembly consists of upper clamp 18 and lower clamp 19 which are similarly aligned. It is understood, of course, that any desired number of clamp assemblies may be utilized. Extending longitudinally of the inner surface of each clamp is a member 20 which is a source of heat for the clamp. As illustrated, this may be a "far" infrared type unit which is well adapted for this structure. Extending outwardly from the ends of the clamp 18 are rods 21 on each side, and extending outwardly from the ends of the lower clamp 19 are rods 22. As also show in FIGURE 5, the rods 21 and 22 are linked together by a coupling rod 23 which is joined by a turnbuckle 24. This assembly provides a means for hooking the clamps together and forcing them into the cushioning member as shown in FIGURES 2 and 3, while the turnbuckle provides adjustment so that any desired depth of compression may be achieved.

When it is desired to form the crowns and the grooves in the cushioning member after the cushioning member has been completely fabricated, it has been found necessary to first apply moisture to that area of the member which is to be processed. It has been determined by experiments that there must be at least 2% of moisture by weight, and this may be applied either by dipping the member, sprinkling it, or applying steam. While the cushioning member is thus moistened, the clamps are applied as shown, and heat is applied by means of the heating member 20; the heat created in the foam is in the order of 120° F. to 210° F. and preferably about 150° F. The combined use of moisture and heat places a compression set in the foam rubber in the areas where the clamping takes place. The cushioning member, or at least those portions which are clamped, are next subjected to a drying action such as by the use of hot air at temperatures in the order of 210° F., or it may be possible to simply continue to heat the area by means of the heating member 20. At any rate, it is necessary to almost completely dry the clamped portion of the cushioning member. The clamps may then be removed and the compression set which has been imposed will remain permanently. It has been found that there is no danger of this groove returning to its original position when the above process has been followed. The actual amount of compression which may be achieved is a function of the density and thickness of the cushioning member, as well as the positioning of the clamp assemblies.

It should be understood that the heating member 20, which has been described as a "far" infrared rod, may be replaced by other types of conventional heating devices. For example, it may be possible to use other types of infrared heaters such as lamps; dielectric heating; or induction heating. Another type of heating device which has been found to be practical is illustrated in FIGURE 4 in which upper and lower clamps 25 and 26 are shown in position. These clamps may be hooked together as shown in FIGURE 2, but the clamps themselves are different in design in that they contain plenum chambers running along their length, the inner portions of the clamps having a series of apertures 32. By means of pipes 33 in both upper and lower clamps, steam may be introduced into the plenum chambers and passed through the apertures 32 into the cushioning member, followed by hot air which is introduced in the same manner This serves to moisten the areas and subsequently dry them again, after which the clamps are removed with the same result as described above This is only one of many methods which can be used, but the principal feature of the invention involves this application of pressure to the member while it is subjected to moisture and heat, followed by drying, to create the permanent compression set in the cushioning member.

It should also be noted that in the event the grooves and the crowns are to be applied in the manufacturer's plant during processing of the cushioning member, it is only necessary to apply a V-shaped clamp, such as clamps 16, 17, 18, and 19 without the heating member 20, provided these clamps are utilized after the member is stripped from the mold and prior to the final processing. The clamps may be applied and hooked together to form the assemblies as shown in FIGURE 2, after the member is washed in the conventional washing process. When the member is then passed through the conventional dryer with the clamps still in place, the same result will occur as previously described except that now it is unnecessary to supply an additional heat source, since the dryer is normally at a temperature of 210° F. to 250° F. This simplified apparatus, therefore, provides a means whereby the manufacturer of the cushioning member, rather than the furniture manufacturer, may achieve the desired results.

FIGURE 6 illustrates a finished product after any of the above clamps have been removed. As can be seen, the cushioning member 11 is now divided by the transverse grooves 27 and 28 into three segments 29, 30, and 31. By using conventional cutting means along the grooves 27 and 28, the member may be divided into three cushions of which the cushion 30 will now have a crown in both directions. The end cushions 29 and 31 will also be transversely crowned and will have a crown at one end in a longitudinal direction. Since this is for illustrative purposes only, it must be realized that the use of an additional clamp at or near the outer ends of the cushioning member 11 could also be used to create a crown at these ends as well. Alternatively, the non-crowned ends could be joined to each other to form a longer cushion for final use, or may be further processed by adding clamps anywhere along these surfaces.

The above details are for purposes of example only, and it should be understood that many other variations are possible within the scope of the invention. For example, if it is desired to provide grooves in only one surface of the member, it is only necessary to use a single clamp upon the desired surface while the member is placed upon a level support

We claim:

1. The method of forming crowned areas in vulcanized foam rubber cushioning comprising the steps of placing groove-forming members against the upper and lower surfaces thereof, applying pressure to said members and forcing them toward each other and into said surfaces, moistening the areas of said cushioning contacted by said members, and applying sufficient heat to said areas to provide permanent deformation of said cushioning.

2. The method of claim 1 including the step of applying heat directly to said members.

3. The method of claim 1 in which said heat is in the range of 120° F. to 210° F.

4. The method of claim 1 in which said permanent deformation is in the form of V-shaped grooves to create said crowned areas.

5. Apparatus for forming permanent grooves in vulcanized foam rubber cushioning comprising groove-forming members adapted to extend across the upper and lower surfaces of the cushioning, pressure means for forcing said members toward each other and into said surfaces, and means for applying heat to said members.

6. The apparatus of claim 5 in which means for applying heat is mounted directly on said pressure means.

7. The apparatus of claim 5 in which said pressure means comprises rods coupling said members together.

8. The apparatus of claim 7 in which said rods are adjustable.

9. The apparatus of claim 7 in which said members are generally V-shaped.

10. The apparatus of claim 7 in which said members are opposite each other.

References Cited

UNITED STATES PATENTS

| | | | |
|---|---|---|---|
| 1,175,133 | 3/1916 | Davidson | 18—19 XR |
| 1,542,207 | 6/1925 | Barker | 18—19 |
| 2,575,259 | 11/1951 | Cox et al. | 264—321 XR |
| 2,655,196 | 10/1953 | Magnani | 18—19 XR |
| 2,933,767 | 4/1960 | Vieli et al. | 264—321 XR |
| 2,946,713 | 7/1960 | Dusina et al. | 264—321 XR |
| 3,125,621 | 3/1964 | Coppick | 264—50 XR |

FOREIGN PATENTS

| | | |
|---|---|---|
| 601,681 | 7/1960 | Canada. |

JULIUS FROME, *Primary Examiner.*

PHILIP E. ANDERSON, *Assistant Examiner.*